(12) United States Patent
Jenne et al.

(10) Patent No.: US 9,690,358 B2
(45) Date of Patent: Jun. 27, 2017

(54) METHOD AND APPARATUS FOR SYSTEM CONTROL OF A CENTRAL PROCESSING UNIT (CPU) MAXIMUM POWER DETECTOR

(71) Applicant: Dell Products, LP, Round Rock, TX (US)

(72) Inventors: John E. Jenne, Austin, TX (US); Shawn J. Dube, Austin, TX (US); Sandor Farkas, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 108 days.

(21) Appl. No.: 14/619,727

(22) Filed: Feb. 11, 2015

(65) Prior Publication Data
US 2016/0231802 A1    Aug. 11, 2016

(51) Int. Cl.
G06F 11/30 (2006.01)
G06F 1/32 (2006.01)
G06F 1/26 (2006.01)
G06F 1/30 (2006.01)

(52) U.S. Cl.
CPC ........... *G06F 1/3243* (2013.01); *G06F 1/263* (2013.01); *G06F 1/3212* (2013.01); *G06F 1/30* (2013.01)

(58) Field of Classification Search
CPC ................................ G06F 1/30; G06F 1/3203
USPC ........................................................ 713/340
See application file for complete search history.

(56) References Cited

U.S. PATENT DOCUMENTS

| | | | |
|---|---|---|---|
| 5,970,074 A * | 10/1999 | Ehiro | G01R 31/30 714/745 |
| 7,421,604 B1 | 9/2008 | Mimberg | |
| 7,441,137 B1 | 10/2008 | Mimberg | |
| 2002/0190673 A1 * | 12/2002 | Brenden | H02P 6/20 318/400.25 |
| 2003/0125900 A1 * | 7/2003 | Orenstien | G06F 1/3203 702/132 |
| 2004/0207375 A1 * | 10/2004 | Umemoto | H02M 3/156 323/282 |
| 2006/0176098 A1 * | 8/2006 | Chen | H02M 3/156 327/341 |
| 2008/0266911 A1 * | 10/2008 | Han | H02M 3/156 363/50 |
| 2011/0010567 A1 * | 1/2011 | Schmitz | G06F 1/3203 713/300 |
| 2011/0055596 A1 | 3/2011 | Wyatt | |
| 2011/0055597 A1 | 3/2011 | Wyatt | |

(Continued)

*Primary Examiner* — Jaweed A Abbaszadeh
*Assistant Examiner* — Volvick Derose
(74) *Attorney, Agent, or Firm* — Larson Newman, LLP

(57) ABSTRACT

A method and apparatus for system control of a central processing unit (CPU) maximum power detector are provided. In accordance with at least one embodiment, a decision is made as to whether a response of a maximum power detector of the CPU is to be altered. When the response is to be altered, a modified input level is provided to the maximum power detector to alter the response. As an example, the modified input level can prevent the maximum power detector from triggering a power throttling function. When the response is not to be altered, an existing input level for the maximum power detector is maintained. In accordance with at least one embodiment, an apparatus or information handling system can comprise a voltage regulator (VR), a current sensor, a CPU comprising a maximum power detector, and a digital to analog converter (DAC).

20 Claims, 5 Drawing Sheets

(56) References Cited

U.S. PATENT DOCUMENTS

| | | | |
|---|---|---|---|
| 2011/0260782 A1* | 10/2011 | Wagner | G05F 1/565 |
| | | | 327/538 |
| 2012/0192195 A1* | 7/2012 | El-Moursy | G06F 9/4893 |
| | | | 718/103 |
| 2013/0222162 A1* | 8/2013 | Xiao | H03M 1/1047 |
| | | | 341/120 |
| 2014/7006831 | 3/2014 | Jenne | |
| 2014/0132236 A1* | 5/2014 | Darmawaskita | H02M 3/156 |
| | | | 323/283 |
| 2014/0198538 A1* | 7/2014 | Kimura | H02M 3/3376 |
| | | | 363/21.09 |
| 2014/0239922 A1* | 8/2014 | Nene | G05F 1/10 |
| | | | 323/234 |
| 2014/0239935 A1* | 8/2014 | Nene | H02M 3/1588 |
| | | | 323/304 |
| 2015/0115832 A1* | 4/2015 | Conroy | G05F 1/56 |
| | | | 315/294 |
| 2015/0378429 A1* | 12/2015 | Vogman | G06F 1/3296 |
| | | | 713/320 |
| 2016/0179163 A1* | 6/2016 | Haider | G06F 1/3203 |
| | | | 713/320 |
| 2016/0179164 A1* | 6/2016 | Park | G06F 1/324 |
| | | | 713/322 |

\* cited by examiner

METHOD AND APPARATUS FOR SYSTEM CONTROL OF A CENTRAL PROCESSING UNIT (CPU) MAXIMUM POWER DETECTOR

FIELD OF THE DISCLOSURE

The present disclosure generally relates to information handling systems, and more particularly relates to central processing unit (CPU) power management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
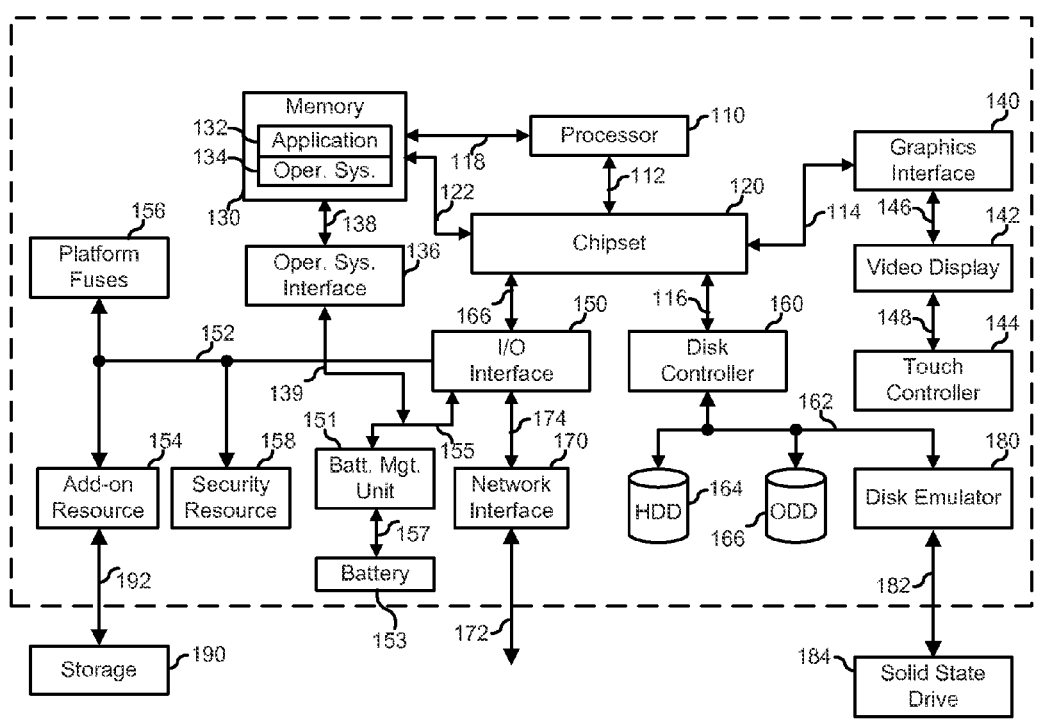
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 110 via a graphics interface 114, and provides a video display output 146 to a video display 142. Video display 142 is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BIM 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 is connected to chipset 120 via connection 166. I/O interface 150 includes a peripheral interface 152 that connects the I/O interface to an add-on resource 154, to platform fuses 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Figure 2:
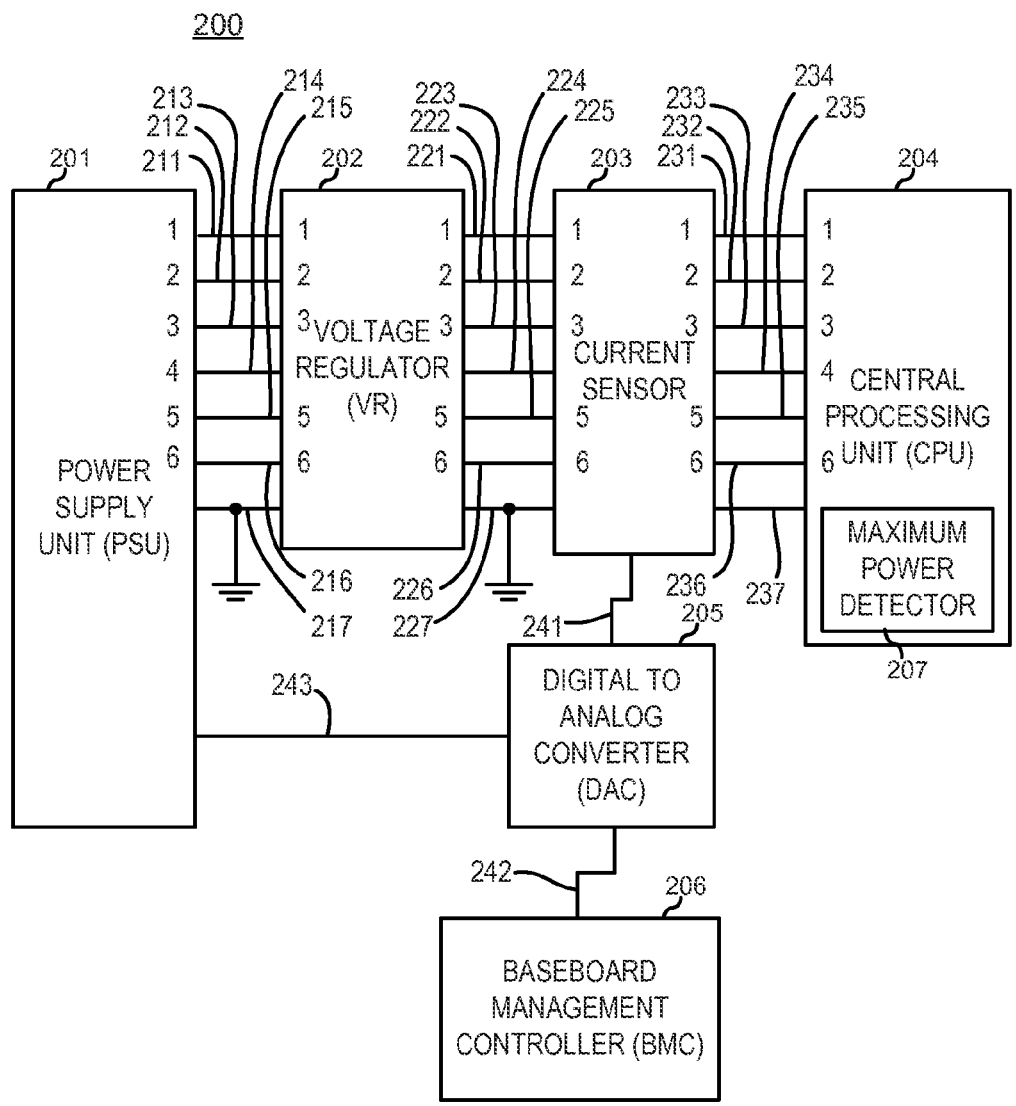
FIG. 2 is a block diagram illustrating apparatus for system control of a CPU maximum power detector according to an embodiment of the present disclosure.

FIG. 2 is a block diagram illustrating apparatus for system control of a CPU maximum power detector according to an embodiment of the present disclosure. Apparatus 200 comprises power supply unit (PSU) 201, voltage regulator (VR) 202, current sensor 203, CPU 204, digital to analog converter (DAC) 205, and baseboard management controller (BMC) 206. CPU 204 comprises maximum power detector 207. PSU 201 is connected to VR 202 via, for example, power connections 211, 212, 213, 214, 215, and 216 and ground connection 217. VR 202 is connected to current sensor 203 via, for example, power connections 221, 222, 223, 224, 225, and 226 and ground connection 227. Current sensor 203 is connected to CRU via, for example, power connections 231, 232, 233, 234, 235, and 236 and connection 237. DAC 205 is connected to current sensor 203 via connection 241. In accordance with at least one embodiment, DAC 205 provides a voltage output. In accordance with at least one embodiment, DAC 205 provides a current output. DAC 205 is connected to PSU 201 via connection 243. DAC 205 is connected to BMC 206 via connection 242.

Figure 3:
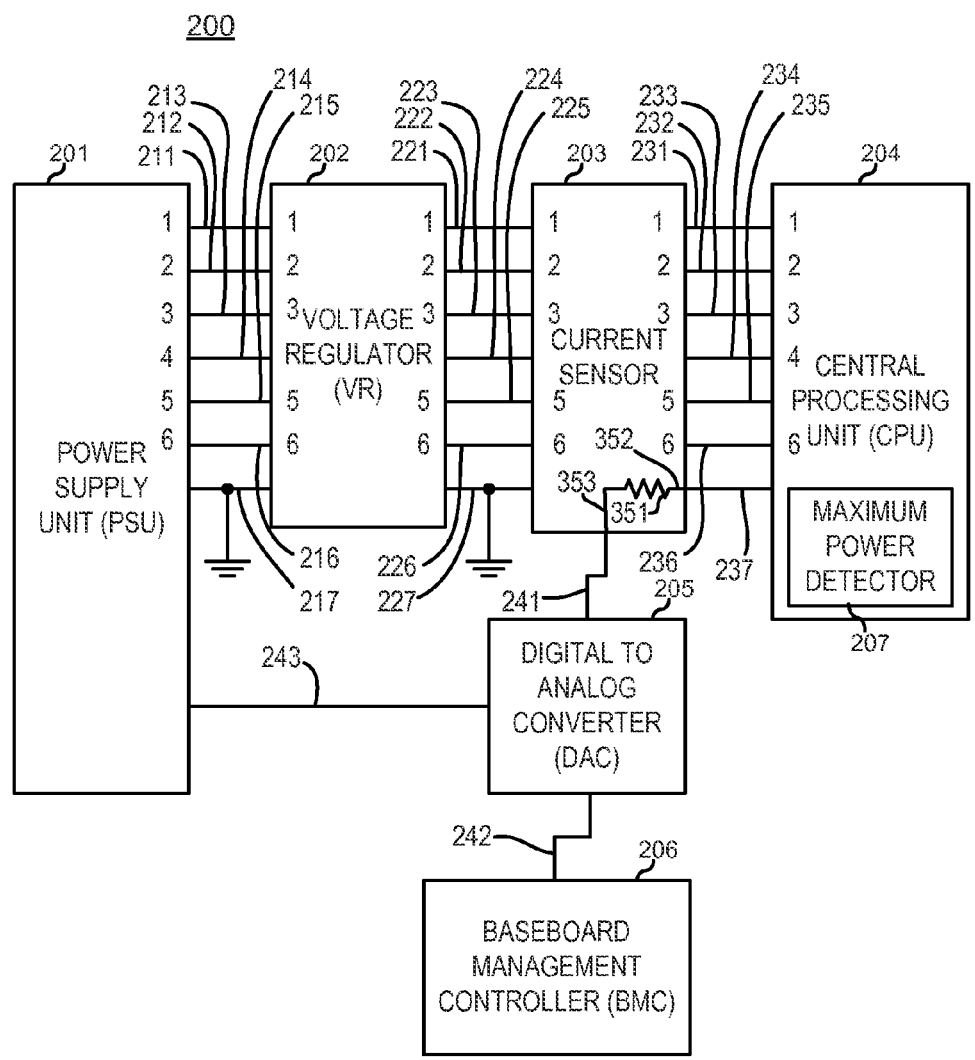
FIG. 3 is a schematic diagram illustrating a current sensor for the apparatus of FIG. 2 according to an embodiment of the present disclosure.

FIG. 3 is a schematic diagram illustrating a current sensor for the apparatus of FIG. 2 according to an embodiment of the present disclosure. Current sensor 203 comprises sensor resistor 351. A first end of sense resistor 351 is connected to connection 237, which is connected to CPU 204. A second end of sense resistor 351 is connected to internal connection 353, which is connected to connection 241, which is connected to DAC 241. Maximum power detector 207 of CPU 204 bases power measurement decisions on a reference voltage at connection 237. As an example, CPU 204 can supply a current at connection 237 with the expectation that the second end of sense resistor 351 is connected to a ground potential such that the current flow through the sense resistor 351 will convert the supplied current to a directly corresponding voltage at connection 237. However, by connecting the second end of resistor 351, via internal connection 353, to connection 241, which is connected to an output of DAC 205, the directly corresponding voltage that would otherwise be provided at connection 237 is offset by the voltage at the output of DAC 205. As an example, DAC 205 can be used as a negative voltage adder to add a negative voltage to what would otherwise be the directly corresponding voltage. Thus, DAC 205 can be used to reduce the voltage at connection 237. By reducing the voltage at connection 237, DAC 205 can be used to prevent maximum power detector 207 from detecting a threshold being crossed. As an example, by preventing maximum power detector 207 from detecting a threshold being crossed, an action to be undertaken based on the crossing of the threshold, such as the triggering of throttling power usage by the CPU, can be prevented from occurring. Such inhibiting of power throttling can be useful, for example, when another part of the apparatus, such as BMC 206, can accurately determine if PSU 201 can provide a needed amount of power even in absence of power throttling. Thus, limitations of maximum power detector 207 can be overcome to allow BMC 206 to assist in active power management and maximize performance based on PSU 201 capabilities.

Figure 4:
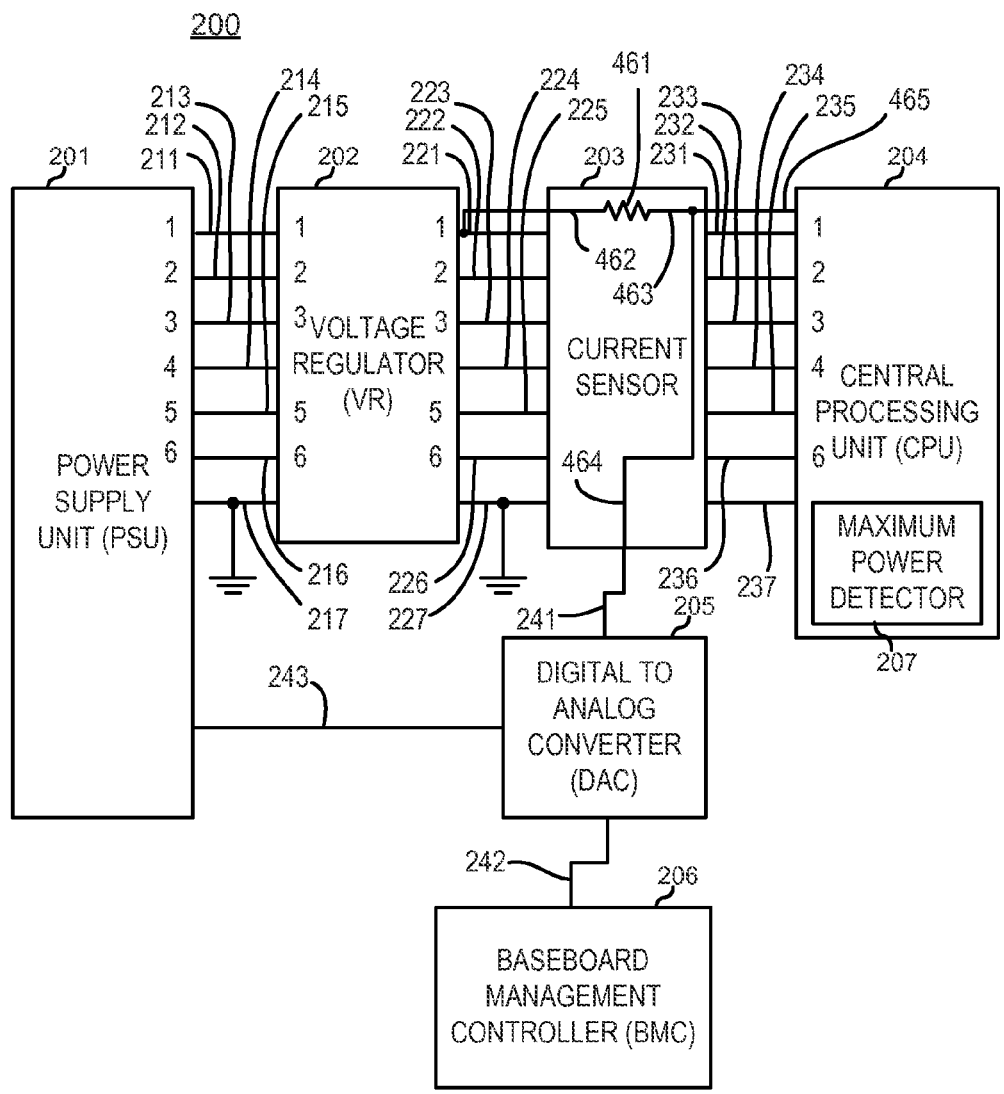
FIG. 4 is a flow diagram illustrating a current sensor for the apparatus of FIG. 2 according to an embodiment of the present disclosure.

FIG. 4 is a flow diagram illustrating a current sensor for the apparatus of FIG. 2 according to an embodiment of the present disclosure. Current sensor 203 comprises sensor resistor 461. A first end of sense resistor 461 is connected to connection 462, which is connected to connection 221 near VR 202. By connecting connection 462 to connection 221 near VR 202, connection 462 can serve as a Kelvin voltage sensing connection unaffected by any voltage drop along connection 221 as a result of any resistance of connection 221. A second end of sense resistor 461 is connected to internal connection 463, which is connected to connection 465 and to internal connection 464. Connection 465 is connected to maximum power detector 207. Internal connection 464 is connected to connection 241, which is connected to DAC 241. Maximum power detector 207 of CPU 204 bases power measurement decisions on connection 465, for example, on a voltage present at or a current through connection 465. By applying the output of DAC 205 to connection 241, which is applied, via internal connection 464, to connection 465, operation of maximum power detector 207 of CPU 204 can be externally controlled. As an example, BMC 206 can determine that PSU 201 can provide sufficient power to accommodate a power excursion and can have DAC 205 apply an output signal to connection 465 that prevents maximum power detector 207 from triggering power throttling.

Figure 5:
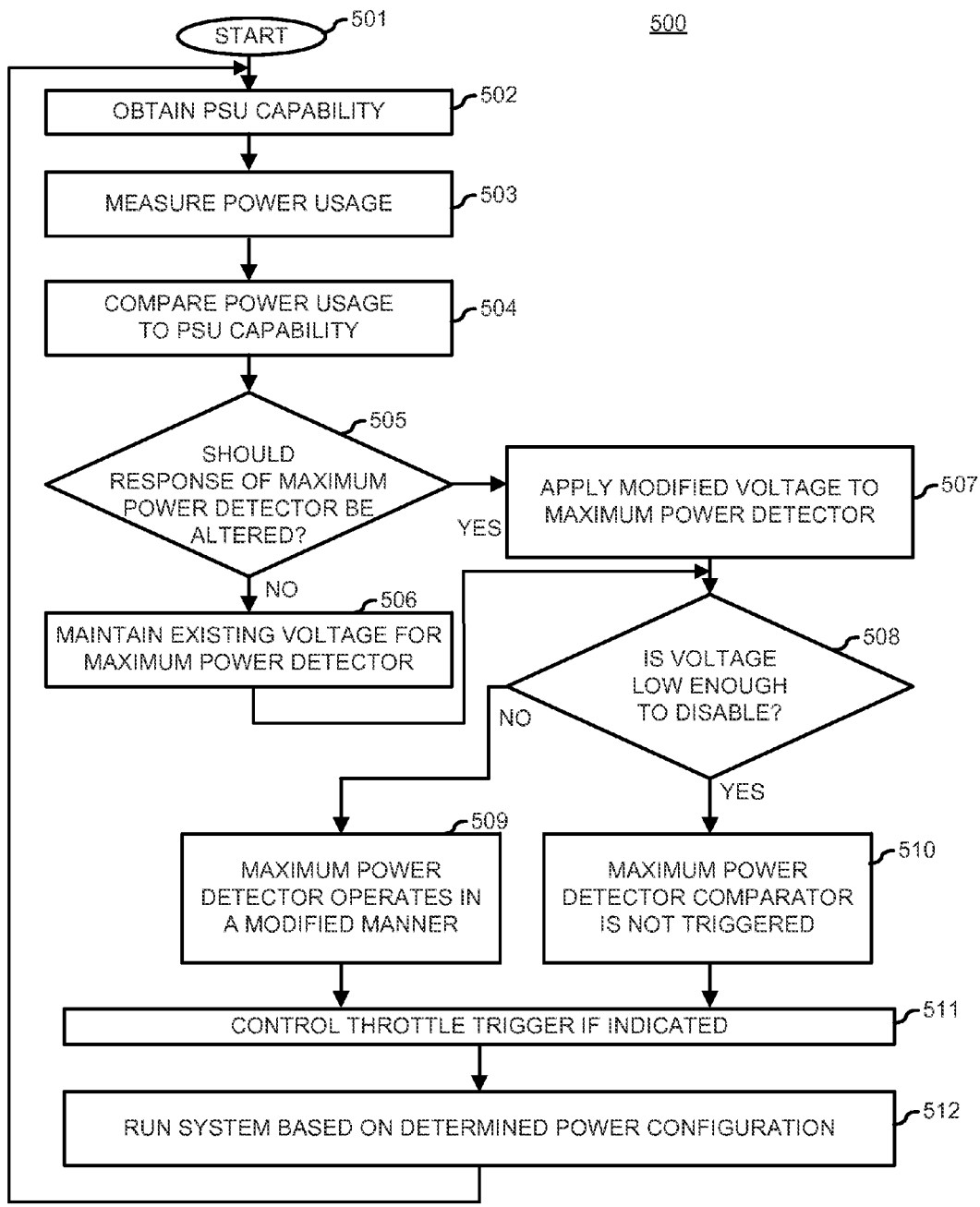
FIG. 5 is a flow diagram illustrating a method for system control of a CPU maximum power detector according to an embodiment of the present disclosure.

FIG. 5 is a flow diagram illustrating a method for system control of a CPU maximum power detector according to an embodiment of the present disclosure. Method 400 begins in block 501. From block 501, method 500 continues to block 502. In block 502, a PSU capability is obtained. As an example, BMC 206 obtains information representative of a capability of PSU 201. From block 502, method 500 continues to block 503. In block 503, power usage is measured. As an example, PSU 201 or BMC 206 can measure power usage. From block 503, method 500 continues to block 504. In block 504, power usage is compared to PSU capability. From block 504, method 500 continues to decision block 505. In decision block 505, a decision is made as to whether or not a modified voltage should be applied to a connection to a CPU. As an example, the modified voltage can be used to alter the response of maximum power detector 207 of CPU 204 to power usage. As an example, BMC 206 can alter the response of maximum power detector 207 of CPU 204 to power usage based on information BMC 206 has representative of a capability of PSU 201 relative to the power usage. If, in decision block 505, the decision is made that the response of maximum power detector 207 should be altered, method 500 continues to block 507. For example, a decision that the response of maximum power detector 207 should be altered may include deciding whether and, if so, to what level, the CPU peak power should be limited. Once a peak power level is determined, a corresponding voltage (such as, a modified voltage) to be applied to maximum power detector 207 to alter the response of maximum power detector 207 is determined. In block 507, the modified voltage is applied to the maximum power detector. As an example, BMC 206 may use DAC 205 to apply the modified voltage to a connection of CPU 204 such that the modified voltage is applied to maximum power detector 207. From block 507, method 500 continues to decision block 508. If, in decision block 505, a decision is made that a modified voltage should not be applied, method 500 continues to block 506. In block 506, an existing voltage is maintained for the maximum power detector, and the maximum power detector continues to operate according to the existing voltage, not according to a modified voltage. From block 506, method 500 continues to block 508. In decision block 508, a decision is made as to whether or not the voltage is low enough to disable a function of the maximum power detector. Such a decision need not be made by the same element or elements (such as, BMC 206) that perform other features of method 500. As an example, the maximum power detector may perform the features of decision block 508 and blocks 509 and 510, and BMC 206 may perform the features of blocks 502-504, decision block 505, and blocks 506 and 507. As an example, BMC 206 can have DAC 205 apply a voltage low enough to disable a function of maximum power detector 207, such as a throttle trigger function. As another example, BMC 206 can have DAC 205 apply a voltage that alters a function of maximum power detector 207 without altogether disabling the function. If the decision is made in decision block 508 that the voltage is low enough to disable the function, method 500 continues to block 510. In block 510, the maximum power detector comparator is not triggered. From block 510, method 500 continues to block 511. If, in decision block 508, a decision is made that the voltage is not low enough to disable the function, method 500 continues to block 509. In block 509, the maximum power detector operates in a modified manner. From block 509, method 500 continues to block 511. In block 511, a throttle trigger is controlled if indicated. As an example, maximum power detector 207 of CPU 204 can trigger a throttling of power if indicated based on the influence of the modified voltage on maximum power detector 207 of CPU 204 can refrain from triggering a throttling of power if a throttling of power is not indicated based on the influence of the modified voltage on maximum power detector 207 of CPU 204. From block 511, method 500 continues to block 512. In block 512, the system is run based on the determined power configuration, as established in the foregoing description. As examples, the system can be run according to the configurations described with respect to blocks 506, 509, or 510. From block 512, method 500 can return, for example, to block 502 and reiterate method 500.

While decision block 508 pertains to a decision of whether or not the voltage is low enough to disable the throttle triggering of maximum power detector 207, voltage modification can be used, but is not limited to, enabling or disabling the throttle triggering to force or prevent a throttle response of maximum power detector 207. As another example, voltage modification can be used to adjust the throttle triggering threshold in response to, for example, changes in PSU capability or system power consumption. Moreover, while method 500 is described with respect to voltage, as another example, current modification can be used. As an example, a DAC providing a current output can inject a current at a connection coupled, either directly or indirectly, to an input of maximum power detector 207 to alter the response of maximum power detector 207. The altering can be simply enabling or disabling the response of maximum power detector 207, or the altering can adjust the throttle triggering threshold, for example, in response to PSU capability or system power consumption.

In the never-ending pursuit of higher performance, processor vendors are pushing higher power limits. Features such as Intel's Turbo Boost allow the processor to operate at higher than rated frequency over clock as long as specified power and thermal envelopes are maintained. In some cases, the specified power envelope is being redefined to allow short excursions above the traditional thermal design power (TDP). For example, dynamic power (Pdyn) is defined as additional power the processor can draw up to 120% of TDP for several seconds. Excursions above Pdyn may occur up to maximum power (Pmax) for several milliseconds until reactive power controls take effect. A maximum power for typical applications can be defined as yet another power level to be implemented in computing platforms and can provide a fixed threshold for triggering maximum power detector response.

Due to increased core count, evolution of higher powered advanced vector extensions (AVX) instructions and other technology advances, the peak power (above TDP) increases each generation of computing platforms. A maximum power detector feature that takes advantage of the fast voltage regulator slew rates can be provided where any power transient above the fixed threshold for triggering maximum power detector response will be detected and rapidly throttled down to a defined limited power level. The fast detect and throttle prevents the full CPU load step from propagating to the power supply unit. Thus, what can appear as, for example, a 500 to 600 ampere per microsecond step in current at the voltage regulator can be controlled to appear as only, for example, a one to two ampere per microsecond step in current at the power supply unit. Throttling may continue to a lower power level as defined by a CPU configuration register.

While such capability is a significant step towards managing peak power to be provided from the system level power source, implementation of such capability using a static circuit and a non-programmable assertion threshold can limit performance. As an example, such a mechanism implemented using a static circuit cannot be disabled if system configuration has sufficient headroom to handle the CPU's full peak power. As another example, such a mechanism implemented using a static circuit prevents the trigger threshold from being moved to eliminate throttling for workloads that exceed the characterized fixed threshold for triggering maximum power detector response. Because of the fixed nature of the fixed threshold for triggering maximum power detector response, operating systems, applications, etc. are optimized for the fixed threshold, and power excursions above the fixed threshold may occur more frequently than planned, thereby reducing performance more frequently than expected. The fixed threshold is set at a level at which the system power source generally does not have peak power capability to support. The fixed threshold cannot be lowered when the static circuit is used, which can limit system configurations. A technique that avoids the use of the static circuit can avoid the disadvantages of the static circuit.

By modifying the voltage at one end of a current sensing element coupled to a CPU's maximum power detector, the disadvantages of a static circuit can be avoided. As an example, by modifying a reference voltage at an end nearer a ground potential of a sense resistor coupled to the CPU's maximum power detector, the amount by which the reference voltage has been modified can show up as an additive component of the sense voltage at a current sourced voltage sensing pin. By implementing the mechanism for modifying the voltage in an adjustable manner, such as by using a digital to analog converter (DAC), a programmable offset can be provided to a voltage comparator circuit of the maximum power detector inside the CPU.

A technique for adjusting an input of a maximum power detector of a CPU can enable a system (such as, a baseboard management controller) to dynamically control when the maximum power detector trigger should occur. Thus, the triggering of the maximum power detector need not be dependent only on the power supply unit and the operation of the CPU. In accordance with at least one embodiment, a dynamically adjustable processor power transient detection and throttling system can be provided. In accordance with at least one embodiment, a dynamically adjustable voltage regulator over-current warning can be provided and can be used to allow acceptable transient power excursions while triggering throttling of power consumption to conform to power supply unit limitations.

With higher peak CPU power forthcoming, mechanisms to detect and control these peak excursions are useful for obtain maximum performance from a power supply unit without having to increase the size of the power supply unit to accommodate the peak excursions. Efficient operation of the power supply unit can help protect environmental resources while minimizing performance impact.

While the above description is in the context of a CPU having a maximum power detector, embodiments can also be used in other applications to create flexibility for fixed voltage sense solutions. For example, embodiments can interactively modify a sense voltage used to measure instantaneous power and to modify power consumption based on the instantaneous power measurement.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific integrated Circuit (ASIC), a Field Programmable Gate Array (FPGA), a structured ASIC, or a device embedded on a larger chip), a card (such as a Peripheral Component Interface (PCI) card, a PCL-express card, a Personal Computer Memory Card international Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An apparatus comprising:
   a power supply unit to generate electrical power;
   a voltage regulator (VR) connected to the power supply unit to receive the electrical power;
   a current sensor coupled to the VR to sense a current;
   a central processing unit (CPU) comprising a maximum power detector, the CPU connected to the current sensor; and
   a digital to analog converter (DAC) having a first connection to the power supply unit and a second connection to the current sensor, the DAC producing an output on the second connection to the current sensor that dynamically prevents an operation of the maximum power detector in the CPU based on the current.

2. The apparatus of claim 1 further comprising:
   a third connection between a baseboard management controller (BMC) and the DAC, the BMC configured to control the DAC that generates the output.

3. The apparatus of claim 2 wherein the BMC is configured to control the DAC to override a function of the maximum power detector based on the output on the second connection.

4. The apparatus of claim 3 wherein the BMC is configured to control the DAC to override a power throttle trigger function of the maximum power detector based on the output on the second connection.

5. The apparatus of claim 1 wherein the current sensor comprises a sense resistor.

6. The apparatus of claim 1 wherein the current sensor comprises a resistor having a first end coupled to the CPU and a second end coupled to the DAC via the second connection.

7. The apparatus of claim 1 wherein the maximum power detector adds the output produced by the DAC on the second connection.

8. An information handling system comprising:
   a power supply unit generating electrical power;
   a voltage regulator (VR) connected to the power supply unit to receive the electrical power;
   a current sensor coupled to the VR to sense a current;
   a central processing unit (CPU) comprising a maximum power detector, the CPU coupled to the current sensor; and
   a digital to analog converter (DAC) having a first connection to the power supply unit and a second connection to the current sensor, the DAC producing an output on the second connection to the current sensor that dynamically prevents an operation of the maximum power detector based on the current.

9. The information handling system of claim 8 further comprising:
   a third connection between a baseboard management controller (BMC) and the DAC, the BMC configured to control the DAC that generates the output.

10. The information handling system of claim 9 wherein the BMC is configured to control the DAC to override a function of the maximum power detector based on the output on the second connection.

11. The information handling system of claim 10 wherein the BMC is configured to control the DAC to override a power throttle trigger function of the maximum power detector based on the output on the second connection.

12. The information handling system of claim 8 wherein the current sensor comprises a resistor.

13. The information handling system of claim 8 wherein the current sensor comprises a resistor having a first end coupled to the CPU and a second end coupled to the DAC via the second connection.

14. The information handling system of claim 8 wherein the maximum power detector adds the output produced by the DAC on the second connection.

15. A method comprising:
determining if a response of a maximum power detector of a central processing unit (CPU) is to be altered based on a current associated with a current sensor;
when the response of the maximum power detector is to be altered, applying an output generated by an analog to digital converter to the maximum power detector to alter the response, wherein the output generated by the analog to digital converter usurps control over the maximum power detector with respect to triggering a power throttling function of the CPU; and
when the response of the maximum power detector is not to be altered, maintaining an existing voltage for the maximum power detector.

16. The method of claim 15 further comprising:
determining if the output generated by the analog to digital converter has a value that disables the power throttling function;
when the output generated by the analog to digital converter fails to disable the power throttling function, operating the maximum power detector to prevent triggering a power throttling function.

17. The method of claim 16 further comprising:
running a system based on a determined power configuration, wherein the determined power configuration is a result of the determining if the response of the maximum power detector of the CPU is to be altered and the determining if the output generated by the analog to digital converter disables the power throttling function.

18. The method of claim 15 further comprising:
measuring power usage consumed by the central processing unit; and
comparing power usage to a capability of a power supply unit (PSU).

19. The method of claim 18 further comprising obtaining information representative of the capability of the PSU.

20. The method of claim 15 further comprising controlling a trigger that determines the power throttling function.

* * * * *